July 1, 1930.  E. M. McMURTRY  1,768,705
HITCH FOR TRAILERS OR THE LIKE

Filed Dec. 8, 1927

INVENTOR.
EUGENE M. McMURTRY
BY
U. G. Charles
ATTORNEY.

Patented July 1, 1930

1,768,705

UNITED STATES PATENT OFFICE

EUGENE M. McMURTRY, OF TOPEKA, KANSAS

HITCH FOR TRAILERS OR THE LIKE

Application filed December 8, 1927. Serial No. 238,602.

My invention relates to improvements in a hitch for trailers or the like.

The object of my invention is to provide a detachable hitch means for trailers, one portion thereof being attached to the vehicle.

A further object of my invention is to provide a hitching means that is operative without the use of tools.

A still further object of my invention is to provide a hitching means functioning as a swivel and one that is inexpensive and simple to operate.

These and other objects will hereinafter be more fully explained, reference being had to the accompanying drawings, in which.

Figure 1:
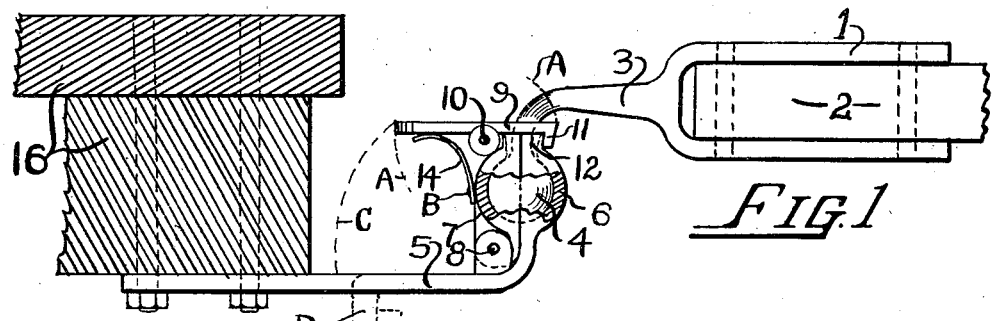
Fig. 1 is a side view of the mechanism attached to a structure of the vehicle, which is shown in section.
Figure 2:
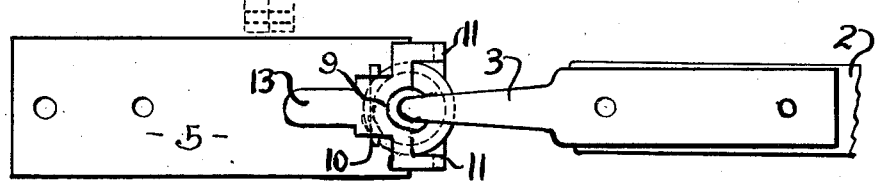
Fig. 2 is a plan view of the mechanism.
Figure 3:
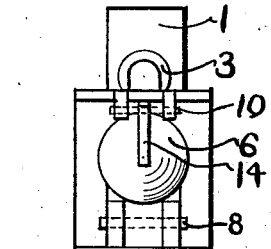
Fig. 3 is a front view.

The mechanism herein disclosed consists of a member having one end bifurcated as at 1, the said bifurcation adapted to receive the outer end of a trailer tongue 2. Extending from the bifurcated portion is a shank 3 having a right angle bend and integrally connected with a ball 4, the said ball being seated in a socket carried by an arm 5, the said arm having a right angle bend and forming one-half of a socket which is concaved as shown at 6, the other half being concaved in a member 7 which is pivotally connected to the arm as at 8. On the opposite end of last said concaved member is a catch 9 pivotally attached as at 10, the said catch being bifurcated and having a detent 11 transversely positioned on each end of the bifurcation to engage with a rim portion 12 of the first said portion of the socket. On the opposite end from the bifurcation is an extension 13 functioning as a lever, by which means the detents are disengaged when the lever is pushed downward, the rocking movement thereof indicated by dotted lines A—A, which movement will disengage the catch. Rigidly attached to the side of member 7 as at B is spring 14, the said spring being the tensioning means for the throw of the catch to engagement.

It will be understood that member 7 is free to rock in the direction shown by dotted line C in Fig. 1, by which means the socket is opened for inserting or removing the ball.

In Fig. 1 the arm 5 is shown rigidly attached to the rear portion of a truck bed 16, and for such engagement the arm is preferably made straight as shown. A hook, however, may be formed as shown by dotted lines D as a convenient means to attach to a cross bar E usually placed in connection with a spare tire rack as supporting means therefor. Other means of attachment may be resorted to, or other forms for the arm when the trailer is to be connected to automobiles of different makes. Such other modifications may be employed as lie within the scope of the appended claim.

Having fully described my invention, what I claim as new and desire to secure by Letters Patent is:

In a trailer hitch, a ball and socket coupling, the ball portion connected to a tongue of a trailer and the socket portion connected to a bed of a vehicle, by means of a bracket, the socket portion comprising a hollow spherical housing, the housing being divided into two portions, one of the portions being hingedly connected to the other portion at its lower extremity and having a latch member pivotally positioned thereon at its upper extremity to engage as holding means when the two portions of the housing engage the ball, a spring as holding means for the latch substantially as shown.

In testimony whereof I affix my signature.

EUGENE M. McMURTRY.